United States Patent Office 2,863,140
Patented Dec. 2, 1958

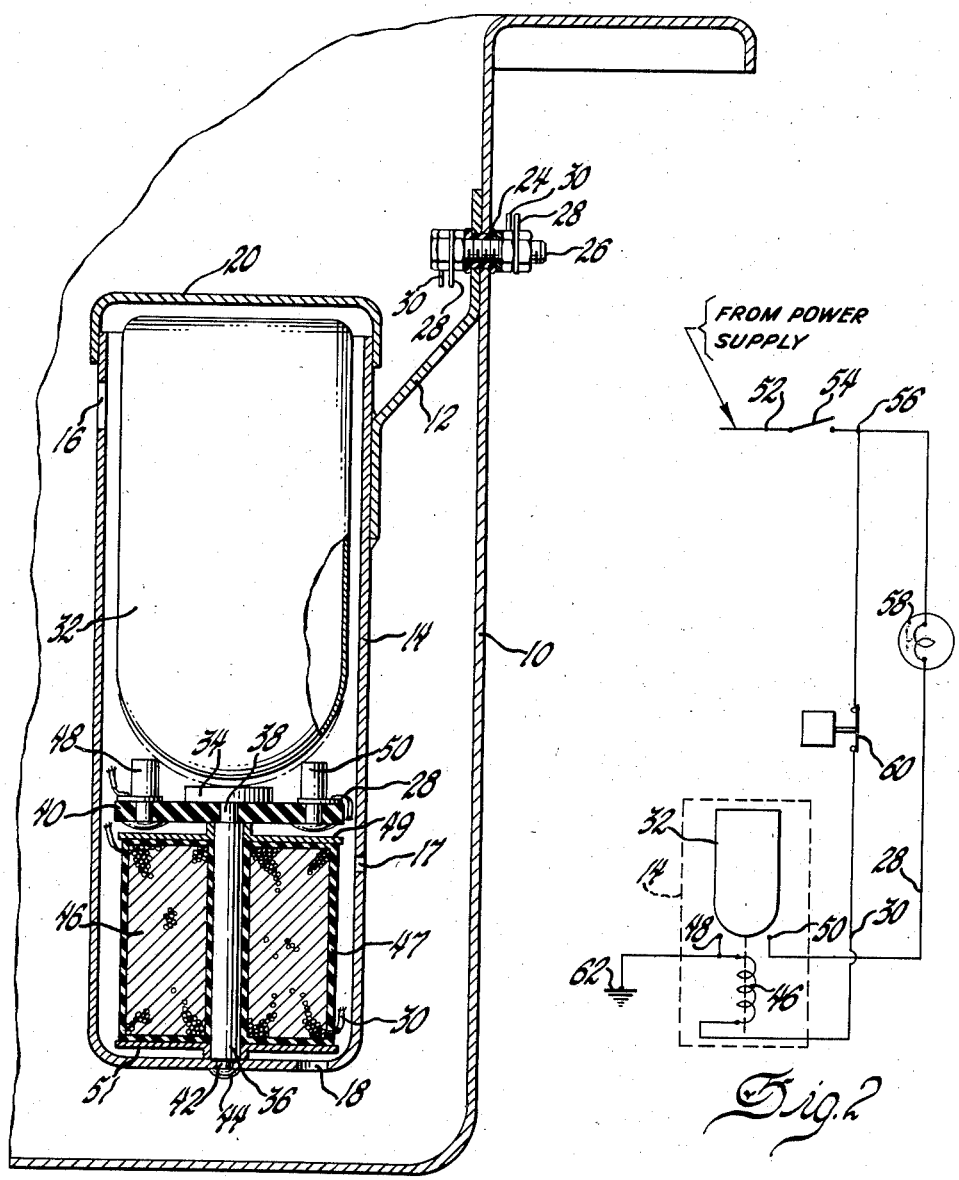

2,863,140

SYSTEMS FOR INDICATING LIQUID LEVEL

Jesse E. Eshbaugh, Flint, Mich., assignor to General Motors Corporation, Detroit, Mich., a corporation of Delaware Application May 9, 1957, Serial No. 658,061

6 Claims. (Cl. 340—244)

This invention relates to indicating systems and more particularly to systems for indicating liquid levels in tanks.

Devices have been used heretofore which serve to present a warning or indication that a predetermined level of liquid in a tank has been reached or exceeded. Such devices are quite common in many fields. In automobiles, devices have been used to indicate a low level of fuel in gasoline tanks and also low levels of oil in the crankcase. These prior devices have not been as satisfactory as it was hoped they would be for the reason that with the passage of time there was no certainty that the devices remained operative. When an emergency eventually presents itself, such as a low level of oil in a crankcase, it could well be that the device would not serve its function. Accordingly, a need has arisen for a device which would not only be operative normally to give a warning or indication that a given liquid level has been reached or exceeded, but also would be capable of periodically advising the operator that the device or system employed is in its normal and operative condition and capable to perform its function when and if the emergency occurs.

An object of the present invention is to provide an improved system for indicating that a predetermined level of liquid in a tank has been reached or exceeded. Another object of the invention is to provide a system for indicating that a liquid level in a tank has been reached and which is capable of automatically being tested for operativeness at frequent intervals during the course of operation of the mechanism with which the system is associated.

To these ends, a feature of the present invention comprises an indicating device and an auxiliary switch associated with circuitry controlled by a float whereby the indicating device is capable of giving not only an indication of the liquid level, but also an indication of the operability of the device prior to a state of emergency.

This and other important features of the invention will now be described in detail in the specification and then pointed out more particularly in the appended claims.

In the drawings:

Fig. 1 is a sectional view taken vertically through a portion of a liquid tank in which portions of a level indicating system are installed; and Fig. 2 is a diagrammatic view of an indicating system to which the present invention is directed and some of the parts represented being shown in Fig. 1.

In the drawings a portion of an engine crankcase or tank 10 is shown to the side wall of which a bracket 12 is attached for supporting a vertical elongated container 14. The latter is preferably made of steel but may be of brass or other metal. It is perforated as at 16, 17 and 18 and is provided with a cap member 20 at one end. With this arrangement liquid in the tank 10 is enabled to enter the inner tank 14 through openings 16, 17 and 18 and, as a consequence, a relatively stable liquid level will be assumed within the tank 14 which level is not unduly influenced by abrupt and momentary variations in liquid level outside the tank 14.

The vertical wall of the tank 10, as well as a portion of the bracket 12, is perforated at two points for the installation of two rubber grommets such as the grommet 24. These serve to support two bolts, such as the bolt 26, in insulated relation with respect to the tank and the bracket. Each of these bolts serves as a connection included in either of the electrical lines 28 or 30 shown in Fig. 2. A float 32, which conveniently may be made of soft steel, is arranged to be vertically movable within the tank 14 for a short distance. The lower end of the float is semi-spherical and closely approaches the head 34 of an electromagnet core 36. The magnet core is of soft steel or iron and has a reduced portion 38 which passes through a dielectric or rigid plastic sheet 40 for supporting the latter. The lower end of the core 36 is reduced in diameter as at 42 and peened over as at 44 rigidly to fix the electromagnet to the bottom wall of the tank 14. A coil 46 of insulated wire surrounds the core 36 and is supported thereon within an envelope 47 of synthetic rubber resistant to oil. The coil with its envelope is confined between two end plates 49 and 51 which may be of soft steel.

Opposite portions of the dielectric sheet 40 support contacts 48 and 50. These contacts are so placed as to be in the path of the metal float 32 when the latter lowers or is urged into its lowermost position.

In Fig. 2 the inner tank 14 is shown in dash lines. Current from a power source is supplied by a line 52 and this current is controlled by a switch 54 which, in the case of a vehicle, may be an engine ignition switch. The lines 28 and 30 are connected to the line 52 at 56 and the line 28 passes through an indicating device such as a lamp 58 and it is led to the contact 50. The line 30 is adapted to conduct current through a normally closed auxiliary switch 60 to the lower end of the coil 46. In the instant disclosure the switch 60 is a pressure operated switch, i. e., a switch which is normally closed but which opens after the vehicle engine starts. The lubricating oil system of the engine may be used to furnish the requisite oil pressure to open the switch 60. Instead of the switch 60, other switch arrangements such as the starter switch, a separate generator relay switch or a separate manually operated switch may be used for the purpose of momentarily energizing the coil 46. The upper end of the coil 46 is connected, together with the contact 48, to the ground 62.

Assuming that the supply of oil in the tank 10 is low, i. e., below a level at which the float 32 would be buoyant, the float will contact both contacts 48 and 50. When the switch 54 is closed, the lamp 58 will be illuminated to indicate the low level regardless of the open or closed position of the auxiliary switch 60.

On the other hand, if it be assumed that the supply of oil is such as to fill the tank 10 or to provide a level adequate to lift the float 32 from the contacts 48 and 50, a closure of the switch 54, when starting the engine, will momentarily energize the coil 46 by current passing through the line 30 and the normally closed switch 60. This will cause the electromagnet 36 to pull the float downwardly to the contacts momentarily to give a testing signal by the lamp 58. Current through the lamp is cut off by the build-up of the engine oil pressure (or opening of the engine starter switch if such alternative is employed) as the engine begins to run. The oil pressure opens the switch 60, the coil 46 is deenergized, and the float rises a short distance as limited by the cover 20.

With the normal and periodic starting of the vehicle engine, the indicator system will automatically be tested and the user knows that it will warn him if and when the liquid level becomes too low. It will be appreciated that the device can be used to indicate any predetermined level which could be high, intermediate or low. If the device is to be adapted to indicate the attainment of a predetermined high level of fluid in a tank, the arrangement of the electromagnet and the float could be reversed, i. e., the float could be placed beneath the electromagnet. In such a reversed arrangement the high level of liquid would cause the electromagnet to lift the float against gravity instead of combating buoyancy as in the arrangement illustrated in the drawings. In the reversed arrangement referred to a switch would again be employed to perform the function of the switch 60 in the drawings, i. e., it would be normally closed and automatically and periodically opened for testing of the warning system during a protracted period of alternate non-use and use of the equipment with which the system is associated.

I claim:

1. A system for indicating low liquid level including a tank, a float in said tank, magnetic material forming at least a portion of said float, two contacts and an electromagnet including a coil fixed in position in said tank beneath said magnetic material, one of said contacts being connected to ground and one end of said coil, the other of said contacts being connected through an indicating device to a control switch at a power source, the other end of said coil being connected through a normally closed auxiliary switch to said control switch, and the arrangement being such that closing of the said control switch will activate said indicating device by means of current passed through the latter, said contacts and said magnetic material when said level is low and said auxiliary switch is open, and energize said electromagnet and indicating device when said auxiliary switch is closed.

2. A system for indicating low liquid level including a tank, a magnetic float in said tank, an electromagnet including a coil in said tank adjacent to said float, contacts adapted to be bridged by said float upon lowering of the latter, an indicating device and an auxiliary switch, parallel circuits in said system, one of said circuits including said auxiliary switch and said coil, the other of said circuits including said indicating device and said contacts.

3. A system for indicating liquid level including a magnetic float, circuitry effected by positioning of said float with a variation in liquid level, an electromagnet adjacent said float and including a coil, said circuitry involving an auxiliary normally closed switch and said coil connected in series, said electromagnet affecting the positioning of said float when current is supplied to said coil, and an indicating device connected in parallel with said auxiliary switch and coil and adapted to engage in series with said magnetic float.

4. A system for indicating liquid level including a main tank, a smaller tank in said main tank and having openings in opposite end portions, a circuit controlling float in said smaller tank, an electromagnet including a coil in said smaller tank adjacent to said float, a periodically operable auxiliary switch in a circuit including said coil, an indicating device, a circuit for operating said indicating device, and said float being adapted to close the circuit through said indicating device when a predetermined liquid level is attained and when said auxiliary switch is closed periodically to energize said electromagnet.

5. A system for indicating a predetermined liquid level including a perforated tank adapted to be immersed in liquid, a circuit controlling float with a limited range of movement in said tank, an electromagnet including a coil adjacent to one end of said float and adapted when energized to attract the latter, an auxiliary switch and an indicating device connected in parallel to a current supply, said coil being connected in series with said auxiliary switch and ground and arranged to energize said electromagnet when said auxiliary switch is closed thereby to establish a circuit through said indicating device and float.

6. A system for indicating a predetermined liquid level including a float confined for limited vertical movement in liquid, an auxiliary switch and an indicating device connected in parallel to a current supply, an electromagnet arrangement including a coil and associated with said float, said coil and auxiliary switch being connected in series to cause said electromagnet arrangement to move said float in one direction and close a circuit through said indicating device and float to ground when said auxiliary switch is closed and said liquid level is not established, and said indicating device and float being connected in series to ground when said liquid level is attained and said auxiliary switch is open.

No references cited.